United States Patent
Wei

(10) Patent No.: US 8,619,344 B2
(45) Date of Patent: Dec. 31, 2013

(54) METHOD OF IMAGE JOINING FOR SCANNER

(75) Inventor: Chih-Hsien Wei, Taipei (TW)

(73) Assignee: Muller Capital, LLC, Wilmington, DE (US)

( * ) Notice: Subject to any disclaimer, the term of this patent is extended or adjusted under 35 U.S.C. 154(b) by 2777 days.

(21) Appl. No.: 11/267,251

(22) Filed: Nov. 7, 2005

(65) Prior Publication Data

US 2007/0007433 A1 Jan. 11, 2007

(30) Foreign Application Priority Data

Jul. 8, 2005 (TW) .............................. 94123293 A

(51) Int. Cl.
*H04N 1/00* (2006.01)
*H04N 1/36* (2006.01)
*H04N 1/40* (2006.01)
*H04N 1/04* (2006.01)

(52) U.S. Cl.
USPC ........... 358/486; 358/404; 358/412; 358/444; 358/474; 358/497

(58) Field of Classification Search
USPC .................. 358/404, 412, 444, 474, 486, 497
See application file for complete search history.

(56) References Cited

U.S. PATENT DOCUMENTS

| | | | | |
|---|---|---|---|---|
| 4,684,998 | A | * | 8/1987 | Tanioka et al. ............... 358/473 |
| 5,239,393 | A | * | 8/1993 | Takeuchi ...................... 358/474 |
| 6,233,063 | B1 | * | 5/2001 | Bernasconi et al. ......... 358/474 |
| 6,369,918 | B1 | * | 4/2002 | Tom et al. ..................... 358/486 |

* cited by examiner

*Primary Examiner* — Fred Guillermety
(74) *Attorney, Agent, or Firm* — Perkins Coie LLP

(57) ABSTRACT

An image joining method for a scanner that scans and transfers image data to a terminal is provided. During scanning and data transfer, when the image data stored in a register is full, an image processor stops the scanning of a linear photodetector. Meanwhile, a matrix photodetector fetches and stores the image of a code strip. Then, the photodetectors are moved backward a distance larger than that being required to be accelerated forward when the scanner resumes scanning. After the data in the register being transferred and cleared, the linear photodetector resumes scanning at a normal moving speed. The code strip image is further fetched and compared with the stored one to get a joining point of scanned image data. By the joining point, the new and prior image data portions are joined and the scanning proceeds, and joined image data will not be overlapped or broken.

30 Claims, 4 Drawing Sheets

METHOD OF IMAGE JOINING FOR SCANNER

CROSS-REFERENCE TO RELATED APPLICATIONS

This non-provisional application claims priority under 35 U.S.C. §119(a) on Patent Application No(s). 94123293 filed in Taiwan on Jul. 8, 2005, the entire contents of which are hereby incorporated by reference.

BACKGROUND OF THE INVENTION

1. Field of Invention

The invention generally relates to a method of joining image, and in particular relates to a method applied in a scanner for joining the image data of a scanned document when the data in a register is full and the scanning is paused and resumed, the joining is prevented from being overlapped or broken.

2. Related Art

FIG. 1 is a schematic diagram of a conventional scanning device including a scanner 10 and a computer terminal 105. When scanning a document (not shown) being illuminated, a linear photodetector 101 gets scanning image signals of the document and transfers to an image processor 102. The image processor 102 converts the signals into digital signals (data) and stores into a register 103. With a protocol between a data-transfer interface 104 and the terminal 105, the image data is transferred from the register 103 to the terminal 105 and displayed.

However, since the transfer speed of image data from the image processor 102 to the register 103 is usually faster than that from the register 103 to the terminal 105, the image data stored in the register 103 is gradually full during the transfer. At a critical point, the image processor 102 has to stop a motor M1 and to stop the scanning of the linear photodetector 101. The motor M1 decelerates to stop the linear photodetector 101 so that the image data stored in the register 103 gets time to be transferred. After then, the motor M1 restarts to speed up the scanning of the linear photodetector 101 till a normal speed. After the pause and resuming, the broken image data portions have to be joined.

Since the motor M1 requires an acceleration time when restarting from still to a normal scanning speed, the linear photodetector 101 is first moved backward before restarting forward so as to resume scanning speed before reaching the position where it stopped scanning last time. By controlling the time of data acquiring when moving backward and forward, the scanning image data is supposed to be suitably joined.

However, caused by mechanical transmission deviation such as backlash of gears, the motor M1 and related transmission elements (not shown) usually make the scanning image data overlapped or broken after the backward and forward movements.

Therefore, there has been a scanning method that scans and stores image data during the backward movement. Then, compare the backward image data with the scanning image data when starting forward so as to get the matched portions for joining.

Still unfortunately, the aforesaid method fails when the scanning image data includes repeating portions.

SUMMARY OF THE INVENTION

The object of the invention is to provide a method applied in a scanner for joining the image data of a scanned document in which the joining is prevented from being overlapped or broken.

An image joining method according to the invention is applicable to a scanner that scans and transfers image data to a computer terminal. The method includes the following steps.

During scanning and data transfer, when the image data stored in the register is full, an image processor stops the scanning. A motor decelerates to stop a scanning photodetector. At the stop position, another photodetector fetches and stores the image of a code strip. Then, the scanning photodetector is moved backward a distance larger than that being required to be accelerated forward when the scanner resumes scanning. After the data in the register being transferred and cleared, the motor restarts to speed up the scanning photodetector till a normal speed and to resume scanning. In a time period, the code strip image is further fetched and compared with the stored code strip image so as to get a joining point of the scanned image data. By the correct joining point, the new and prior image data portions are joined and the scanning proceeds.

Therefore, the invention controls a matrix photodetector to fetch the image of a code strip and utilizes the code strip images to find out the correct joining point of scanned image data. The method prevents the joined image data from being overlapped or broken.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 4:
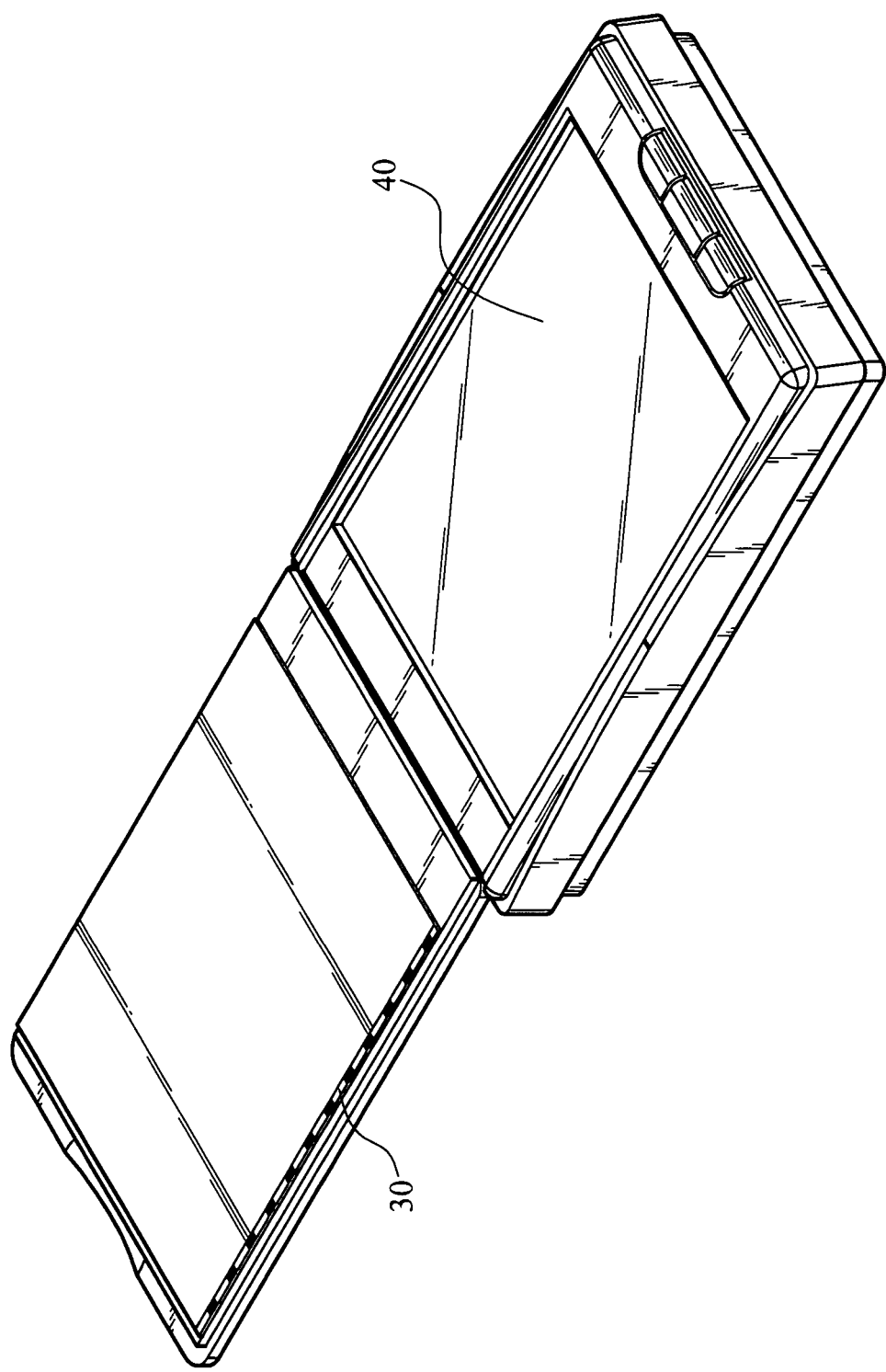
FIG. 4 is an explanatory view of a scanning device applying the method of the invention.

As shown in FIG. 4, a scanner applying the method of the invention for joining image data of a scanned document 40 is equipped with a code strip 30. Further referring to FIG. 2, a scanning device applying the method of the invention includes a scanner 20 and a terminal 205 for receiving image data from the scanner. The scanner 20 includes photodetectors 201, an image processor 202, a data register 203 and a data transfer interface 204.

The photodetectors 201 further includes a linear photodetector 2011 and a matrix photodetector 2012. The linear photodetector 2011 is used to detect the image data of the document 40. The matrix photodetector 2012 is used to detect the image of the code strip 30 mounted on the scanner 20 so as to determine the positions of scanning stop and resuming. The linear photodetector 2011 and the matrix photodetector 2012 are both driven by a motor M2.

The image processor 202 receives analog signals of the scanned image from the linear photodetector 2011 and the code strip image from the matrix photodetector 2012 and converts into digital signal to be stored into the data register 203 and further transferred to the terminal 205 via the data transfer interface 204.

During scanning and data transfer, when the image data stored in the data register 203 is full, the image processor 202 stops the scanning. The motor M2 decelerates to stop the linear photodetector 2011. At the stop position, the matrix photodetector 2012 fetches and stores the image of the code strip 30. Then, the linear photodetector 2011 is moved backward a distance larger than that being required to be accelerated forward when the scanner resumes scanning. After the data in the register 203 being transferred and cleared, the motor M2 restarts to speed up the linear photodetector 2011 till a normal speed and to resume scanning. In a time period, the image of code strip 30 is further fetched and compared with the stored code image so as to get a joining point of scanned image data. By the correct joining point, the new and the prior image data portions are joined and the scanning proceeds.

Of course, the aforesaid stop and resuming process is repeated when the data register 203 being full again.

Figure 1:
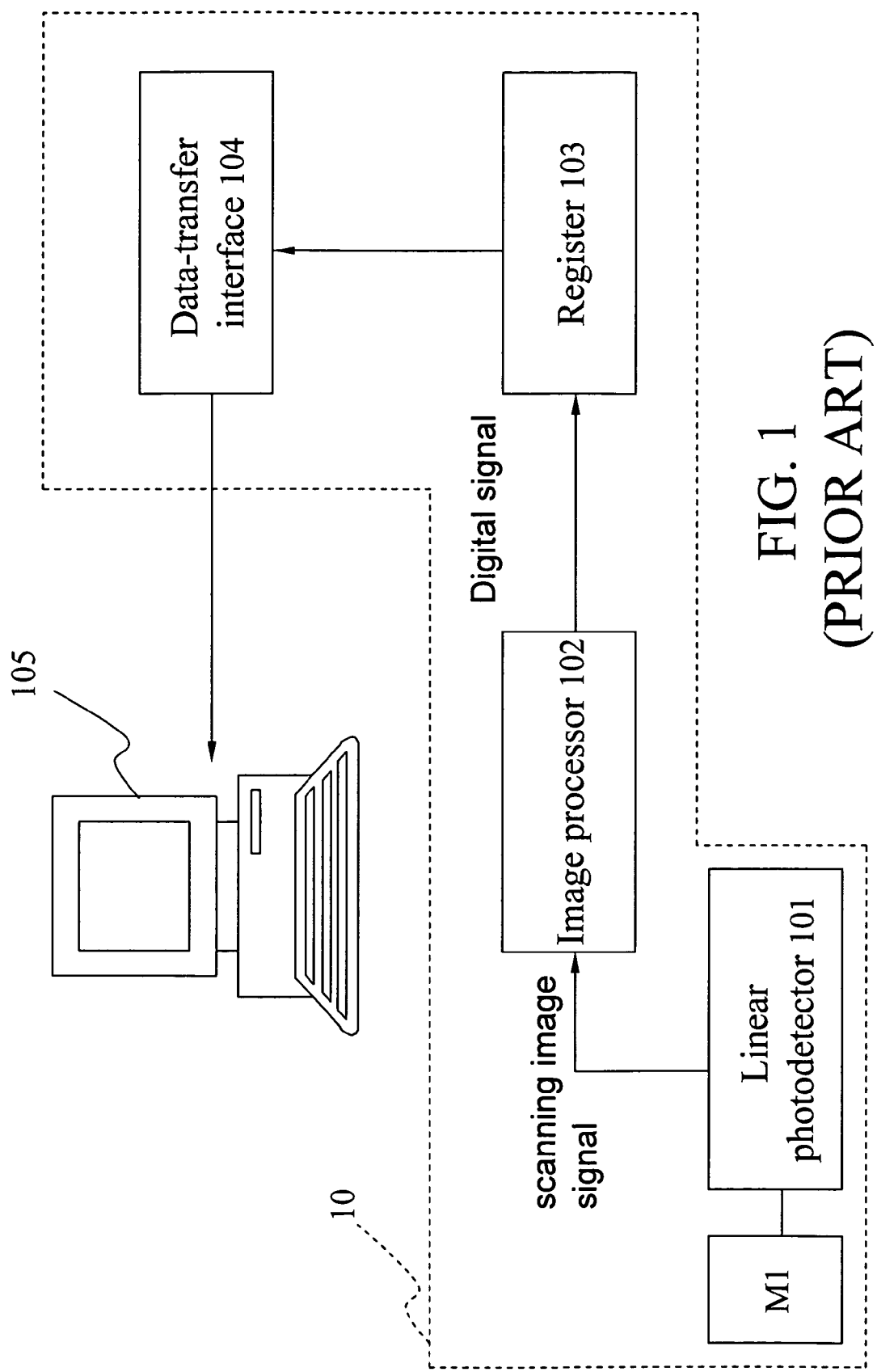
FIG. 1 is a schematic diagram of a conventional scanning device.
Figure 2:
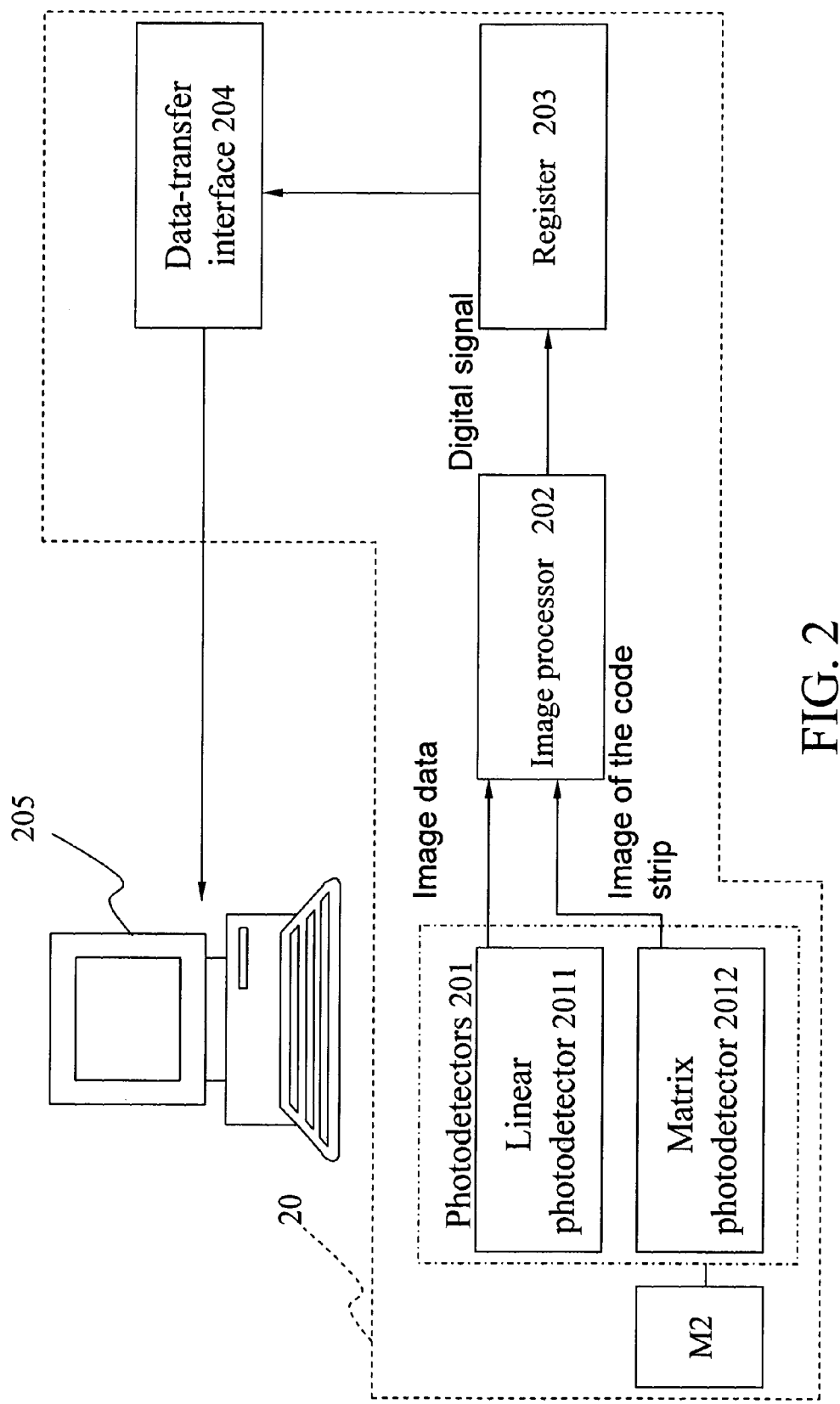
FIG. 2 is a schematic diagram of a scanning device applying the method of the invention.
Figure 3:
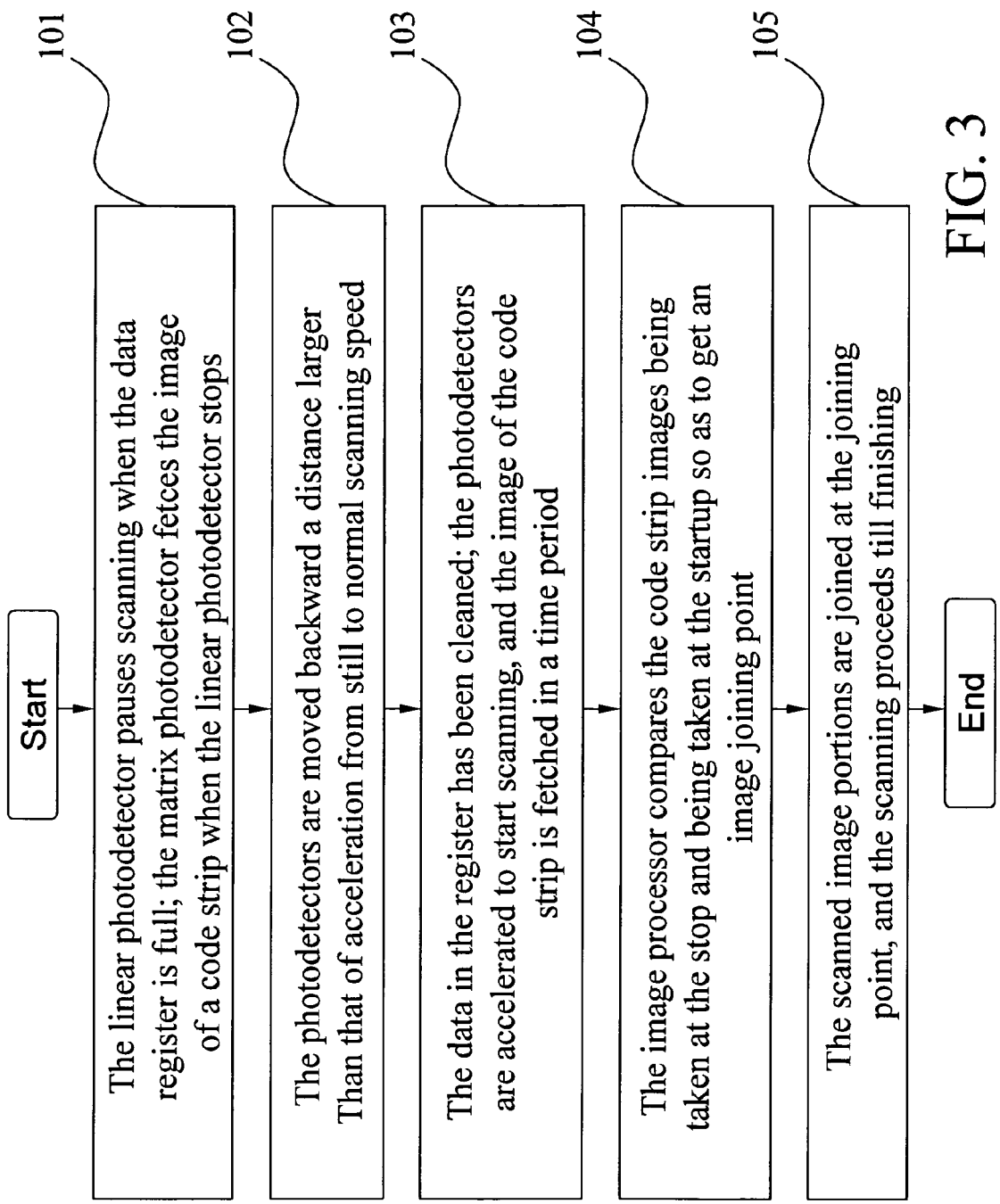
FIG. 3 is a flowchart of the method of the invention.

FIG. 2 is a schematic diagram of a scanning device applying the method of the invention. FIG. 3 is a flowchart of the method of the invention. FIG. 4 is an explanatory view of a scanning device applying the method of the invention. The image joining method of the invention includes the following steps.

In step 101, the image processor stops the motor and the linear photodetector and pauses scanning when the image processor detects the data register being full. Meanwhile, the image processor controls the matrix photodetector to fetch the image of a code strip when the linear photodetector stops.

In step 102, the photodetectors are moved backward by the motor a distance larger than that of acceleration from still to normal scanning speed.

In step 103, the data in the register has been cleared; the photodetectors are accelerated to start scanning, and the image of the code strip is fetched in a time period. The process is started by detection of the image processor that the register is cleared. Then, the image processor starts the motor to drive the linear photodetector accelerated to the scanning speed and obtaining scanned image. Meanwhile, the matrix photodetector fetches the code strip image.

In step 104, the image processor compares the code strip images being taken at the stop and being taken at the startup so as to get a joining point of the scanned image data.

In step 105, the scanned image data portions taken at the stop and taken at the startup are joined at the joining point, and the scanning proceeds till another pause or final finishing of the scan.

Therefore, the invention utilizes the matrix photodetector to fetch images of the code strip and refers to get a joining point of scanned image portions. The invention thus solves the problems of conventional scanning devices that cause overlapped or broken image data by mechanical deviation such as backlash of gears in motor and transmission elements. The method of the invention also prevents from the drawback of another prior art that simply compares backward and forward image portions and fails correct joining when encountering repeating image portions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scanning method comprising:
   scanning first image data in a first direction at a scanning speed with a first photodetector, and storing the first image data in a register;
   decelerating the first photodetector to a stop position and scanning first position image data of a code strip with a second photodetector when the register is full;
   moving the first and second photodetectors in a second direction opposite the first direction by a distance that is greater than an acceleration distance required to accelerate the first photodetector from the stop position to the scanning speed;
   sensing that the register is cleared and accelerating the first photodetector in the first direction to the scanning speed and scanning second image data with the first photodetector, and scanning second image position data of the code strip with the second photodetector;
   comparing the second position image data of the code strip with the first position image data of the code strip to determine a joining point; and
   joining the first image data and the second image data at the joining point.

2. The scanning method of claim 1 wherein decelerating the first photodetector to the stop position comprises decelerating the first photodetector with a motor and stopping the scanning of the first image data with the first photodetector.

3. The scanning method of claim 1 wherein scanning the first position image data of the code strip comprises scanning the first position image data of the code strip with the second photodetector when the first photodetector is at the stop position.

4. The scanning method of claim 1 wherein moving the first and second photodetectors in the second direction comprises moving the first and second photodetectors with a motor that drives the first and second photodetectors.

5. The scanning method of claim 1 wherein sensing that the register is cleared comprises sensing that the register is cleared with an image processor and activating a motor that accelerates the first photodetector to the scanning speed.

6. The scanning method of claim 1 wherein:
   scanning the first and second image data with the first photodetector comprises scanning the first and second image data with a linear photodetector; and
   scanning the first and second position image data with the second photodetector comprises scanning the first and second position image data with a matrix photodetector.

7. The scanning method of claim 1 wherein comparing the second position image data with the first position image data of the code strip comprises comparing the second position image data with the first position image data of the code strip with an image processor.

8. A scanning method comprising:
   scanning first image data with a first photodetector moving in a first direction;
   stopping the first photodetector;
   scanning first position data with a second photodetector after stopping the first photodetector;
   moving the first photodetector and the second photodetector in a second direction opposite the first direction;
   scanning second image data with the first photodetector moving in the first direction and scanning second position data with the second photodetector moving in the first direction;
   comparing the second position data with the first position data to determine a joining point; and
   joining the first image data and the second image data at the joining point.

9. The scanning method of claim 8 wherein moving the first photodetector and the second photodetector in the second direction comprises moving the first photodetector and the second photodetector in the second direction by a distance that is greater than an acceleration distance required to accelerate the first photodetector to a scanning speed.

10. The scanning method of claim 8 wherein scanning the first position data with the second photodetector comprises scanning a code strip while the first photodetector is stationary.

11. The scanning method of claim 8 wherein scanning the second position data with the second photodetector comprises scanning a code strip while the second photodetector is moving the first direction.

12. The scanning method of claim 8, further comprising:
storing the first image data in a register; and
when the register is full, stopping the first photodetector.

13. The scanning method of claim 12, further comprising:
transferring the first image data from the register to a terminal; and
when the first image data is at least partially cleared from the register, scanning the second image data.

14. The scanning method of claim 8 wherein:
scanning the first and second image data with the first photodetector comprises scanning the first and second image data with a linear photodetector; and
scanning the first and second position data with the second photodetector comprises scanning the first and second position data with a matrix photodetector.

15. The scanning method of claim 8 wherein moving the first and second photodetectors comprises simultaneously moving the first and second photodetectors together in the first and second directions.

16. A scanning method comprising:
scanning first image data;
storing the first image data in a register;
suspending the scanning of the first image data in response to a first condition of the register;
scanning first position data while the scanning of the first image data is suspended;
simultaneously scanning second image data and second position data in response to a second condition of the register that is different from the first condition;
determining an image data joining point based on a match between the second image data and the first image data; and
joining the first image data and the second image data at the image data joining point.

17. The method of claim 16 wherein:
scanning the first image data and the second image data comprises scanning the first image data and the second image data with a first photodetector in a first direction at a scanning speed;
scanning the first position data comprises scanning the first position data with a second photodetector while the first photodetector is stationary;
scanning the second position data comprises scanning the second position data with the second photodetector while the second photodetector is moving in the first direction; and
before scanning the second position data, the method further comprises moving the first and second photodetectors in a second direction opposite the first direction by a distance that is greater than an acceleration distance required to accelerate the first photodetector to the scanning speed.

18. The method of claim 16 wherein:
scanning the first position data comprises scanning first position data of a code strip; and
scanning the second position data comprises scanning second position data of the code strip.

19. The method of claim 16 wherein:
scanning the first position data comprises scanning the first position data with a photodetector at a stationary position; and
scanning the second position data comprises scanning the second position data with the photodetector moving in a scanning direction.

20. The method of claim 16 wherein:
suspending the scanning of the first image data comprises suspending the scanning of the first image data when the first condition is that the register is full; and
simultaneously scanning the second image data and the second position data comprises simultaneously scanning the second image data and the second position data when the second condition is that the register is at least partially cleared.

21. An apparatus including a computer-readable medium having instructions stored thereon that, if executed by a scanner, cause the scanner to perform operations comprising:
scanning first image data with a first photodetector moving in a first direction;
stopping the first photodetector and scanning first position data with a second photodetector;
moving the first photodetector and the second photodetector in a second direction opposite the first direction;
scanning second image data with the first photodetector moving in the first direction and scanning second position data with the second photodetector moving in the first direction;
comparing the second position data with the first position data to determine a joining point; and
joining the first image data and the second image data at the joining point.

22. The apparatus of claim 21 wherein moving the first photodetector and the second photodetector in the second direction comprises moving the first photodetector and the second photodetector in the second direction by a distance that is greater than an acceleration distance required to accelerate the first photodetector to a scanning speed.

23. The apparatus of claim 21 wherein scanning the first position data with the second photodetector comprises scanning a code strip while the first photodetector is stationary.

24. The apparatus of claim 21 wherein scanning the second position data with the second photodetector comprises scanning a code strip while the second photodetector is moving the first direction.

25. The apparatus of claim 21 wherein the operations further comprise:
storing the first image data in a register; and
when the register is full, stopping the first photodetector.

26. The apparatus of claim 21 wherein the operations further comprise:
transferring the first image data from the register to a terminal; and
when the register is at least partially cleared, scanning the second image data.

27. The apparatus of claim 21 wherein:
scanning the first and second image data with the first photodetector comprises scanning the first and second image data with a linear photodetector; and
scanning the first and second position data with the second photodetector comprises scanning the first and second image data with a matrix photodetector.

28. The apparatus of claim 21 wherein moving the first and second photodetectors comprises simultaneously moving the first and second photodetectors together in the first and second directions.

29. A scanner comprising:
means for scanning first image data in a first direction;
means stopping the means for scanning first image data;
means for scanning first position data while the means for scanning first image data is stopped;
means for moving the means for scanning first image data and the means for scanning first position data in a second direction opposite the first direction;
means for scanning second image data in the first direction;
means for scanning second position data in the first direction;
means for comparing the second position data with the first position data to determine a joining point; and
means for joining the first image data and the second image data at the joining point.

30. The scanner of claim 29 wherein:
the means for scanning first image data and the means for scanning second image data comprise a linear photodetector;
the means for moving comprises a motor;
the means for scanning first position data and the means for scanning second position data comprise a matrix photodetector; and
the means for comparing and the means for joining comprise a processor.

* * * * *

UNITED STATES PATENT AND TRADEMARK OFFICE
CERTIFICATE OF CORRECTION

| | | |
|---|---|---|
| PATENT NO. | : 8,619,344 B2 | Page 1 of 1 |
| APPLICATION NO. | : 11/267251 | |
| DATED | : December 31, 2013 | |
| INVENTOR(S) | : Wei | |

It is certified that error appears in the above-identified patent and that said Letters Patent is hereby corrected as shown below:

In the Drawings

In Fig. 3, Sheet 3 of 4, for Tag "101", in Line 2, delete "fetces" and insert -- fetches --, therefor.

In the Claims

In Column 4, Line 51, in Claim 8, delete "photodetector:" and insert -- photodetector; --, therefor.

Signed and Sealed this
Thirteenth Day of May, 2014

Michelle K. Lee
*Deputy Director of the United States Patent and Trademark Office*